United States Patent [19]

Sekiya

[11] Patent Number: 4,705,016

[45] Date of Patent: Nov. 10, 1987

[54] PRECISION DEVICE FOR REDUCING ERRORS ATTRIBUTED TO TEMPERATURE CHANGE REDUCED

[75] Inventor: Shinji Sekiya, Tokyo, Japan

[73] Assignee: Disco Abrasive Systems, Ltd., Tokyo, Japan

[21] Appl. No.: 858,773

[22] Filed: May 2, 1986

[30] Foreign Application Priority Data

May 17, 1985 [JP] Japan .............................. 60-72333[U]
Jan. 24, 1986 [JP] Japan .................................. 61-11900

[51] Int. Cl.$^4$ ............................................. B28D 1/04
[52] U.S. Cl. .............................. 125/13 R; 51/165.73
[58] Field of Search .................. 125/13 R; 51/165.72, 51/165.73; 83/72, 74, 522

[56] References Cited

U.S. PATENT DOCUMENTS

| 2,664,787 | 1/1954 | Plimmer | 51/165.73 |
| 2,956,344 | 10/1960 | Rantsch | 51/165.72 |
| 3,427,906 | 2/1969 | Berly | 51/165.73 |
| 4,564,000 | 1/1986 | Stern et al. | 125/13 R |

FOREIGN PATENT DOCUMENTS 83567 6/1980 Japan ................................ 51/165.73

OTHER PUBLICATIONS

"Dicing Saw"—Disco Abrasive Systems, Ltd.

*Primary Examiner*—Harold D. Whitehead
*Attorney, Agent, or Firm*—Beveridge, DeGrandi & Weilacher

[57] ABSTRACT

A precision device including a holding mechanism for holding an object and a supporting mechanism for supporting an operating element, one of which is movable in a predetermined direction. The precision device includes a detecting device for detecting the amount of movement of one of the holding holding and supporting mechanisms in the predetermined direction, and the detecting device includes a scale formed of a material having a coefficient of linear expansion, in a temperature range of −20° to 100° C., of not more than $10 \times 10^{-7}/°C$. as an absolute value. The precision device further includes a detecting device for detecting the amount of thermal expansion of at least a part of the supporting mechanism in the predetermined direction.

11 Claims, 6 Drawing Figures

PRECISION DEVICE FOR REDUCING ERRORS ATTRIBUTED TO TEMPERATURE CHANGE REDUCED

FIELD OF THE INVENTION

This invention relates to a precision device whose errors, attributed to temperature change, in the amount of relative movement of an object and an operating element and/or relative positioning of the object and the operating element are reduced.

DESCRIPTION OF THE PRIOR ART

In the production of semiconductive devices, for example, the surface of a nearly disc-like semiconductor wafer is divided into a plurality of rectangular regions by cutting lines arranged in lattice form (the cutting lines are generally called streets), and a desired circuit pattern is applied to each of the rectangular regions, as is well known to those skilled in the art. The wafer is then cut along the cutting lines to give separated rectangular regions having the applied circuit pattern (the separated rectangular regions are generally called chips). Cutting of a wafer is generally effected by a precision cutting device called a dicer or a dicing device. The width of each cutting line is very narrow, and is generally several tens of micrometers or smaller. Hence, the cutting of the wafer by the precision cutting device should be performed very precisely, and the allowable errors are generally several micrometers or below.

The precision cutting device comprises a holding means for holding a wafer and a supporting means for supporting a cutting blade formed of diamond abrasive grains. The cutting blade is successively positioned on the plurality of cutting lines in the wafer held on the holding means (the so-called indexing operation) by moving one of the holding means and the supporting means in a predetermined direction by the actuation of a driving source. The actuation of the driving source, and therefore, the movement of one of the holding means and the supporting means, are controlled on the basis of the detection of the amount of movement of one of the holding means and the supporting means. The detection is carried out by using a detecting means including a scale having many lines to be detected and a detector for detecting these lines of the scale.

The conventional precision cutting device has the following problems to be solved.

Firstly, in the conventional precision cutting device, the cutting of wafers can be carried out relatively stably with relatively small indexing errors after the lapse of 3 to 4 hours from the starting of the device. Before that time, relatively large indexing errors exceeding the allowable errors frequently occur. For this reason, it is necessary in many cases to perform idling operation of the device for 3 to 4 hours for example before the actual cutting of wafers, and to cut the wafers after the idling operation. This markedly restricts the efficiency of wafer cutting.

Secondly, the experience of the present inventor tells that the conventional precision cutting device can cut wafers relatively stably with relatively small indexing errors for a relatively short period of time after the above idling operation, but when the wafer cutting is continued for a relatively long period of time, for example, 8 hours or longer, the indexing errors tend to increase gradually and exceed the allowable errors.

SUMMARY OF THE INVENTION

A first object of this invention is to provide a novel and excellent precision device which is like the above-described precision cutting device and which can perform the required function fully stably within allowable errors from the start of operation without the need to provide an expensive constant-temperature chamber or to incorporate an expensive temperature control system and also to perform idling operation.

A second object of this invention is to provide a novel and excellent precision device which is like the above-described precision cutting device and which can continuously perform the required function fully stably over a relatively long period of time within allowable errors without the need to incorporate an expensive temperature control system.

The present inventor studied the first problem of the conventional precision cutting device from various aspects, and discovered the following fact.

In the conventional precision cutting device, the cutting blade is fixed to the end portion of a rotating shaft, and in cutting a wafer, the rotating shaft and the cutting blade fixed to it are rotated at relatively high speeds. Starting of the rotation of the rotating shaft causes generation of heat in the rotating shaft and/or its related members, and the rotating shaft and/or its related members are thermally expanded in the axial direction. The present inventor found that the relatively large indexing errors exceeding the allowable errors before the passing of some time from the starting of the device are attributed mainly to the aforesaid thermal expansion of the rotating shaft and/or its related members.

Further investigations of the present inventor on the basis of this fact have now led to the discovery that a precision cutting device which can perform cutting within allowable errors sufficiently stably from the start of the operation can be obtained if the amount of thermal expansion of the rotating shaft and/or its related members is detected by utilizing a measuring standard member having a low coefficient of linear expansion, and compensating the indexing of the cutting blade on the cutting lines of a wafer on the basis of the amount detected; and that the aforesaid theory of compensation in the precision cutting device is not limited to this device but can be applied to various other precision devices.

Thus, according to this invention, there is provided a precision device comprising a holding means adapted to hold an object, a supporting member for supporting an operating element, a driving means for moving at least one of the supporting means and the holding means in a predetermined direction so as to position the object and the operating element in a required relationship, and a control means for controlling the operation of the driving means; said device further comprising a detecting means including a measuring standard member formed of a material having a low coefficient of linear expansion and a detector for detecting the amount of thermal expansion of at least a part of the supporting member in said predetermined direction on the basis of the measuring standard member, said control means being adapted to compensate the control of the operation of the driving means on the basis of the amount of thermal expansion of at least a part of the supporting means in said predetermined direction which is detected by the detector, thereby reducing errors of said positioning attributed to the thermal expansion of the supporting member caused by temperature change.

The operating element of the above precision device can be any of various working tools in various precision working devices or any of various measuring heads in various precision measuring devices.

The present inventor also studied the second problem of the conventional precision cutting device from various aspects, and found the following fact.

Initially, the present inventor thought that the relatively large indexing errors generated during continuous wafer cutting over a relatively long period of time are attributed mainly to the thermal expansion of various structural members of the device including the rotating shaft as a result of heat generated by the continuous operation of the device. The present inventor, however, found later that although the expansion of the structural members of course produces indexing errors, these errors are relatively small, and that the indexing errors are due mainly to the thermal expansion of the scale of the detecting means.

It has previously been believed that to reduce errors attributed to thermal expansion, it is important to make the scale from a material having a coefficient of linear expansion which is substantially the same as, or close to, those of the structural materials. Most of the structural materials are generally made of iron or the like, and therefore, it has been the previous practice to make the scale from a material having a coefficient of linear expansion which is substantially the same as, or close to, the coefficient of linear expansion of iron or the like, typically sode-zinc glass having a coefficient of linear expansion, in a temperature range of $-20°$ to $100°$ C., of about $8 \times 10^{-6}/°$ C.

In view of the fact that the indexing errors are attributed mainly to the thermal expansion of the scale of the detecting means, the present inventor attempted to control the temperature of the scale to a predetermined point (for example, $20°$ C.) by circulating cooling water, and could considerably reduce the indexing errors. If, however, a temperature control system such as a cooling water circulating system is built in the detecting means, the cost of production and the cost of operation of the detecting means naturally rise significantly. In addition, it is possible experimentally, but is extremely difficult, if not impossible, in practive, to control the temperature of the scale to a predetermined point.

The present inventor has further conducted research and experimental work on the basis of the aforesaid fact. This work has led to the surprising discovery that contrary to the conventional common technical knowledge, the indexing errors can be markedly reduced if the scale is made of a material having a very low coefficient of linear expansion. As the coefficient of linear expansion of the material forming the scale decreases, the indexing errors can accordingly be reduced. For practical purposes, the scale is desirably formed in general from a material having a coefficient of thermal expansion (absolute value), in a temperature range of $-20°$ to $100°$ C., of $10 \times 10^{-7}/°$ C.

Thus, according to this invention, there is also provided a precision device comprising a holding means adapted to hold an object, a supporting means for supporting an operating element, and a detecting means, at least one of the supporting means and the holding means being movable in a predetermined direction, and the detecting means including a scale having many lines to be detected and a detector for detecting said lines of the scale and being adapted to detect the amount of movement of at least one of the supporting means and the holding means in said predetermined direction; the scale of the detecting means being made of a material having a coefficient of linear expansion, in a temperature range of $-20°$ to $100°$ C., of not more than $10 \times 10^{-7}/°$ C. as an absolute value.

The operating element in the above precision device can be any of various working tools in various precision working devices or any of various measuring heads in various precision measuring devices.

Preferred materials forming the scale of the detecting means are special glasses. Examples include crystallized glass (coefficient of linear expansion at $-20°$ to $100°$ C.: about $0.6 \times 10^{-7}/°$ C.) sold under the tradename "Neoceram GC-7.N-0" by Japan Electric Glass Co., Ltd., Japan, crystallized glass (coefficient of linear expansion at $-20°$ to $100°$ C.: $-3 \times 10^{-7}$ to $-5 \times 10^{-7}/°$ C.) sold under the tradename "Neoceram GC-2.N-0" by the same company, crystallized glass (coefficient of linear expansion at $-20°$ to $100°$ C.: $8 \times 10^{-7}$ to $10 \times 10^{-7}/°$ C.) sold under the tradename "Neoceram GC-2.N-11" from the same company, crystallized glass (coefficient of thermal expansion at $-20°$ to $100°$ C.: $0.5 \times 10^{-7}$ to $5 \times 10^{-7}/°$ C.) "ZERODUR" by Jena Glaswerk Schott & Gen of West Germany, quartz glass (coefficient of linear expansion at $-20°$ to $100°$ C.: about $5.5 \times 10^{-7}/°$ C.), and high silica glass (coefficient of linear expansion at $-20°$ to $100°$ C.: about $8 \times 10^{-7}/°$ C.) which contains at least 96% by weight of silica and generally called 96% silica glass.

BRIEF DESCRIPTION OF THE DRAWINGS

FIG. 5-A and 5-B are diagrams showing the indexing errors in Example and Comparative Example.

DETAILED DESCRIPTION OF PREFERRED EMBODIMENTS OF THE INVENTION

One specific example of the precision device constructed in accordance with this invention, i.e. one precision cutting device to which the theory of this invention is applied, will be described in detail with reference to the accompanying drawings.

Figure 1:
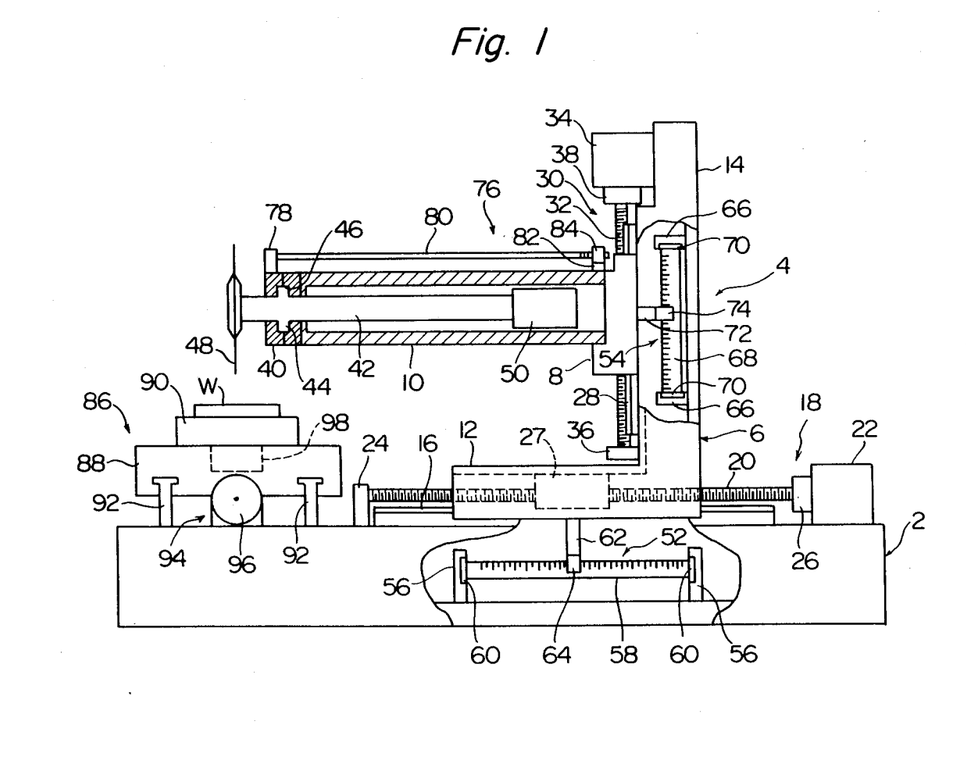
FIG. 1 is a side elevation, partly in section, of one example of the precision cutting device constructed in accordance with this invention.

With reference to FIG. 1, the illustrated precision cutting device has a stationary main base stand 2. A supporting means shown generally at 4 is mounted on the main base stand 2. The supporting means 4 comprises a movable supporting base stand 6, a movable subsidiary supporting base stand 8 and a supporting member 10. The supporting base stand 6 has a horizontal portion 12 and a vertical portion 14, and is mounted on the main base stand 2 so as to move freely in the left-right direction in FIG. 1 and substantially horizontally. More specifically, one, or a plurality of, guide rails 16 extending substantially horizontally in the left-right direction in FIG. 1 are fixed to the upper wall of the main base stand 2, and the horizontal portion 12 is mounted slidably along the guide rails 16. A horizontal driving means 18 is also mounted on the upper wall of the main base stand 2. The driving means 18 includes an externally threaded rod 20 extending substantially horizontally in the left-right direction in FIG. 1, and a driving source 22 which may be a pulse motor. The left end of the externally threaded rod 20 is rotatably journalled on a bearing block 24 fixed to the upper wall of the main base stand 2, and its right end is connected via a speed reduction mechanism 26 to the output shaft of the driving source 22 mounted on the upper wall of the main base stand 2. A block 27 is fixed in place within the horizontal portion 12 of the supporting base stand 6, and an internally threaded through-hole (not shown) extending substantially horizontally in the left-right direction in FIG. 1 is formed in the block 27, and the intermediate portion of the externally threaded rod 20 is received in the internally threaded hole. Hence, when the driving source 22 is actuated and the externally threaded rod 20 is rotated, the supporting base stand 6 is moved substantially horizontally left to-right in FIG. 1 along the guide rail 16.

The subsidiary supporting base stand 8 which may be a nearly rectangular block is mounted on the vertical portion 14 of the supporting base stand 6 so that it can ascend or descend freely substantially vertically. More specifically, one, or a plurality of, substantially extending guide rails 28 are fixed to the left side wall of the vertical portion 14 of the supporting base stand 6, and the subsidiary supporting base stand 8 is mounted slidably along the guide rails 28. A vertical driving means 30 is also mounted on the left side wall of the vertical portion 14 of the supporting base stand 6. The driving means 30 includes a substantially vertically extending, externally threaded rod 32 and a driving source 34 which may be a pulse motor. The lower end of the externally threaded rod 32 is rotatably journalled on a bearing block 36 fixed to the left side wall of the vertical portion 14 of the supporting base stand 6, and its upper end is connected via a speed reduction mechanism 32 to the output shaft of the driving source 34 mounted on the left side wall of the vertical portion 14 of the supporting base stand 6. A vertically extending internally threaded through-hole (not shown) is formed in the subsidiary supporting base stand 8, and the intermediate portion of the externally threaded rod 32 is received in the internally threaded through-hole. Accordingly, when the driving source 34 is operated and the externally threaded rod 32 is rotated, the subsidiary supporting base stand 8 is caused to ascend or descend substantially vertically along the guide rail 28.

The supporting member 10 is cylindrical and extends substantially horizontally to the left in FIG. 1 from its right end fixed to the left side wall of the subsidiary supporting base stand 8 by welding or bolting. A bearing member 40 is fixed to the free end, i.e., the left end, of the supporting member 10. A rotating shaft 42 is mounted on the bearing member 40 rotatably but in such a manner as not to be movable in the left-right direction in FIG. 1 relative to the bearing member 40. More specifically, an annular flange 44 is formed in the rotating shaft 42 extending substantially horizontally in the left-right direction in FIG. 1, and an annular recess 46 having a shape corresponding to the annular flange 44 is formed in the bearing member 40. The rotating shaft 42 is prevented from moving in the left-right direction in FIG. 1 with respect to the bearing member 40 by the receiving of the annular flange 44 in the annular recess 46. The bearing member 40 may conveniently be an air bearing well known to those skilled in the art as a precision bearing. The left end portion of the rotating shaft 42 projects beyond the bearing member 40, and to its projecting end is fixed a thin disc-like cutting blade 48 disposed substantially vertically. The cutting blade 48 may be of a well known type containing superabrasive grains such as diamond abrasive grains. That part of the rotating shaft 42 which is to the right of the annular flange 44 extends within the supporting member 10. A driving source 50 which may be an electric motor is provided within the supporting member 10, and the right end of the rotating shaft 42 is connected to the output shaft of the driving source 50. As will be seen from a description to be given hereinafter, the right end of the rotating shaft 42 can desirably move freely over some range in the left-right direction in FIG. 1 with respect to the supporting member 10. In the illustrated device, the output shaft of the driving source 50 (i.e., the rotor of the electric motor) is permitted to move freely over some range in the left-right direction in FIG. 1 relative to a stationary element of the driving source 50 (i.e., the stator of the electric motor). This construction permits the aforesaid movement of the right end of the rotating shaft 42.

The illustrated precision cutting device includes a first detecting means shown generally at 52 for detecting the amount of movement of the movable supporting base stand 6 in the left-right direction in FIG. 1 with respect to the stationary main base stand 2, and therefore the amount of movement of the cutting blade 48 in the left-right direction in FIG. 1, and a second detecting means shown generally at 54 for detecting the amount of elevation or lowering of the movable subsidiary supporting base stand 8 with respect to the movable supporting base stand 6, and therefore the amount of elevation or lowering of the cutting blade 48. The first detecting means 52 will be described first. A linear scale 58 extending substantially horizontally in the left-right direction in FIG. 1 is provided on the bottom wall of the main base stand 2 by means of a pair of securing brackets 56. Preferably, the two ends of the linear scale 58 are fixed to the securing brackets 56 via elastic members 60 such as synthetic rubber so that even when the bottom wall of the main base stand 2 expands or shrinks by temperature change, the expansion or shrinkage is absorbed by the elastic deformation of the elastic members 60 and no adverse effect is exerted on the linear scale 58. It is important that the linear scale 58 itself is made of a material having a coefficient of linear expansion (absolute value), in a temperature range of $-20°$ to $100°$ C., of not more than $10 \times 10^{-7}/°$ C., preferably the special glasses illustrated hereinabove. A number of lines to be detected having a width of 1 micrometer, for example, are disposed at intervals of for example, 1 micrometer on the linear scale 58. When the linear scale 58 is to be made of the special glass described above, the lines to be detected may be formed by applying a metal such as chromium by known vapor deposition and etching techniques. It is convenient at this time to form an exposure mask used for etching also from the special glass. On the other hand, to the horizontal portion 12 of the supporting base stand 6 is fixed a suspending piece 62 which projects downwardly through an elongated opening rmed in the upper wall of the main base stand 2 and extending in the left-right direction in FIG. 1. A photoelectric detector 64 for detecting the lines to be detected of the linear scale 58 is mounted on the suspending piece 62. The photoelectric detector 64 which may be of a knowntype produces a pulse signal according to the detection of the lines to be detected of the linear scale 58, and therefore, produces a pulse signal every time the supporting base stand 6 moves by 1 micrometer for example, along the guide rails 16. The pulse signals produced by the photoelectric detector 64 are used to control the operation of the driving source 22, and therefore to control the movement of the supporting base stand 6. The second detecting means 54 may be of the same structure as the first detecting means 52. A linear scale 68 extending substantially vertically is provided on the inside surface of the right side wall of the vertical portion 14 of the supporting base stand 6 by a pair of securing brackets 66. As in the case of the first detecting means 52, the two ends of the linear scale 68 are fixed to the securing brackets via elastic members 70. It is important that the linear scale 68 itselft should be made of a material having a coefficient of linear expansion, in a temperature range of $-20°$ to $100°$ C., of not more than $10 \times 10^{-7}/°$ C., preferably the aforesaid special glass. A number of lines to be detected having a width of 1 micrometer are formed on the linear scale 68 at intervals of, for example, 1 micrometer. On the other hand, a projecting piece 72 projecting to the right through an elongated opening formed in the left side wall of the vertical portion 14 of the supporting base stand 6 and extending vertically is fixed to the subsidiary supporting base stand 8. A photoelectric detector 74 for detecting the lines to be detected of the linear scale 68 is mounted on the projecting piece 72. As does the photoelectric detector 64 in the first detecting means 52, the photoelectric detector 74 produces a pulse signal according to the detection of the lines of the linear scale 68, and therefore, produces a pulse signal every time the subsidiary supporting base stand 8 ascends or descends 1 micrometer for example along the guide rails 28. The pulse signals produced by the photoelectric detector 74 are used to control the operation of the driving source 34, and therefore to control the elevation or lowering of the subsidiary supporting base stand 8.

Again with reference to FIG. 1, a third detecting means shown generally at 76 is disposed in the illustrated precision cutting device. A securing bracket 78 is fixed to the bearing member 40 fixed to the free end portion, i.e. the left end portion, of the supporting member 10. A measuring standard member 80 is cantilevered by the securing bracket. The measuring standard member 80 extends substantially horizontally to the right in FIG. 1 along the supporting member 10 from its left end fixed to the securing bracket. It is important that the measuring standard member 80 itself should be made of a material having a low coefficient of linear expansion. Preferably, the measuring standard member 80 is formed of a material having a coefficient of linear expansion, in a temperature range of $-20°$ to $100°$ C., of not more than $10 \times 10^{-7}/°$ C., especially the special glass, as in the case of the linear scales 58 and 68 in the first and second detecting means 52 and 54. A number of lines to be detected having a width of 1 micrometer are formed at intervals of 1 micrometer for example in the free end portion, i.e., the right end portion, of the measuring standard member 80. Accordingly, the measuring standard member 80 in the illustrated embodiment may be considered a linear scale. On the other hand, a projecting piece 82 is fixed to the base end portion, i.e. the right end portion, of the supporting member 10, and a photoelectric detector 84 for detecting the lines to be detected in the measuring standard member 80 is mounted on the projecting piece 82. The photoelectric detector 84 which may be of a known type detects both the direction of movement (left or right in FIG. 1), and the amount of movement, of the measuring standard member 80 on the basis of the lines on the measuring standard member 80. When temperature change causes the supporting member 10 (and the bearing member 40 fixed to its free end) to expand or shrink thermally in the left-right direction in FIG. 1, the measuring standard member 80 is thereby moved to the left or right in FIG. 1. Accordingly, the photoelectric detector 84 detects a change in the length of the supporting member 10 (and the bearing member 40 fixed to its free end) caused by thermal expansion or shrinkage in the left-right direction in FIG. 1, namely the amount of their thermal expansion. A signal produced by the photoelectric detector 84, i.e. a signal showing a change in the length of the supporting member 10 (and the bearing member 40 fixed to its free end) in the left-right direction in FIG. 1 is used to compensate the control of the movement of the supporting base stand 6, as will be described in more detail hereinbelow.

The illustrated precision cutting device further includes a holding means shown generally at 86. The holding means 86 comprises a sliding stand 88 and a suction chuck 90. The sliding stand 88 is mounted on the supporting base stand 2 for free movement in a direction substantially perpendicular to the sheet surface in FIG. 1. More specifically, two guide rails 92 extending in a direction substantially perpendicular to the sheet surface in FIG. 1 are fixed to the main base stand 2, and the sliding stand 88 is mounted slidably along the guide rails 92. Means 94 for driving the sliding stand is also mounted on the main base stand 2. The driving means 94 comprises an externally threaded rod (not shown) extending in a direction substantially perpendicular to the sheet surface in FIG. 1 and mounted rotatably on the main base stand 2 and a driving source 96 which may be a pulse motor. To the sliding stand 88 is fixed a block (not shown) having formed therein an internally threaded through-hole extending in a direction substantially perpendicular to the sheet surface in FIG. 1, and the intermediate portion of the externally threaded rod is received in the internally threaded hole. The output shaft of the driving source 96 is connected to the externally threaded rod via a speed reduction mechanism (not shown). Accordingly, when the driving source 96 is operated and the externally threaded rod is rotated, the sliding stand 88 is moved along the guide rails 92. The suction chuck 90 is mounted on the sliding stand 88 for free rotation about a central axis extending substantially vertically. A driving source 98 (which may be a pulse motor) for rotating the suction chuck 90 is also mounted on the sliding stand 88. Conveniently, the suction chuck 90 itself is of a type which has a plurality of suction grooves opened on its substantially horizontal upper surface or is made of a porous material in at least a part of its upper surface, and is adapted to communicate selectively with vacuum source (not shown) to suck and hold a workpiece such as a semiconductor wafer W placed on its upper surface.

Figure 2:
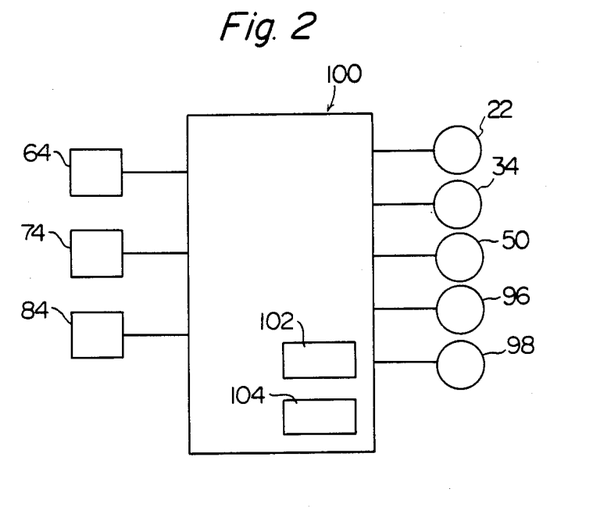
FIG. 2 is a simplified block diagram showing a control means in the precision cutting device shown in FIG. 1.

The illustrated precision cutting device further includes a control means 100 (FIG. 2) for controlling the operations of the driving sources 22, 34, 50, 96 and 98 described above. The control means 100 may be a microprocessor.

The operation of the precision cutting device of the invention described hereinabove will now be described with reference to an example of cutting a semiconductor wafer W.

Figure 3:
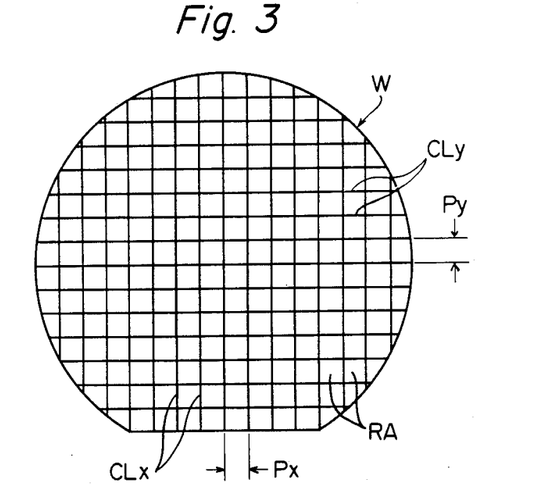
FIG. 3 is a top plan view showing the surface of a semiconductor wafer to be cut by the precision cutting device of FIG. 1.

As shown in FIG. 3, the wafer W has on its surface a plurality of cutting lines arranged in lattice form, namely a first group of cutting lines CLx extending parallel to each other at predetermined intervals Px and a second group of cutting lines CLy extending parallel to each other at predetermined intervals Py. The first group of cutting lines CLx are perpendicular to the second group of cutting lines CLy. A desired circuit pattern is applied to each of a plurality of rectangular regions RA divided by the cutting lines CLx and CLy.

With reference to FIGS. 1 and 3, the wafer W to be cut is placed on the suction chuck 90 of the holding means 86, and then subjected to initial positioning. In the initial positioning, either one of the first group of cutting lines CLx and the second group of cutting lines CLy on the surface of the wafer W, for example the first group of cutting lines CLx, extend in a direction perpendicular to the sheet surface in FIG. 1, and the position, in the left-right direction in FIG. 1, of one of the first group of cutting lines CLx (for example, the cutting line located outermost) is brought into fully precise alignment with the position, in the left-right direction in FIG. 1, of the cutting blade 48. This initial positioning can be carried out by detecting the positions of the cutting lines CLx and CLy present on the surface of the wafer W with respect to the cutting blade 48 by means of a known optical detecting device (not shown), actuating the driving source by the control means 100 on the basis of the detection to rotate the suction chuck 90 through a predetermined angle and also actuating the driving source 22 by the control means 100 on the basis of the detection to move the supporting base stand 6 of the supporting means 10, and therefore the cutting blade 48, a predetermined amount in the left-right direction in FIG. 1. The amount of movement of the supporting base stand 6 in the left-right direction is detected by the first detecting means 52 and fed to the control means 100, whereby the supporting base stand 6 is moved fully precisely. As required, compensation is effected on the basis of detection by the third detecting means 76, as will be described in detail hereinbelow. If desired, a detecting means (not shown) may be provided for detecting the amount of rotation of the suction chuck 90. This detecting means may be comprised of an angular scale fixed to the sliding stand 88 and a photoelectric detector fixed to the suction chuck 90. The angular scale may be formed of a material having a coefficient of linear expansion, in a temperature range of $-20°$ to $100°$ C., of not more than $10 \times 10^{-7}/°$ C. as is the case with the linear scales 58 and 68 in the first and second detecting means 52 and 54. A number of lines to be detected having a width of $0.1°$ and disposed at intervals of $0.1°$ are formed on the angular scale. The detector produces a pulse signal according to the detection of the lines to be detected. Hence, the detector produces a pulse signal every time the suction chuck 90 rotates through $0.1°$, and feeds the pulse signal to the control means 100.

After the initial positioning, the driving source 34 is actuated to lower the subsidiary supporting base stand 8 of the supporting means 4, and therefore the cutting blade 48, to a predetermined operating position. The amount of elevation or lowering of the subsidiary supporting base stand 8 is detected by the second detecting means 54, and consequently, the elevation or lowering of the subsidiary supporting base stand 8 is performed sufficiently precisely. Then, the driving source 50 is actuated to rotate the rotating shaft 42, and therefore the cutting blade 48, counterclockwise as viewed from left in FIG. 1. The driving source 96 is also actuated to move the sliding stand 88 of the holding means 86, and therefore the suction chuck 90 and the wafer W held on it, rearwardly in a direction perpendicular to the sheet surface in FIG. 1. As a result, the rotating cutting blade 48 acts on the wafer W and cuts it along one of the first gourp of cutting lines CLx. When the cutting is over, the driving source 96 is stopped to stop the movement of the sliding stand 88. Then, the driving source 34 is actuated to elevate the subsidiary supporting base stand 8 of the supporting means 4 to a predetermined position, whereby the cutting blade 48 is elevated to a non-operating position at which it does not interfere with the wafer W. Thereafter, the driving source 96 is actuated to move the sliding stand 99, and therefore the suction chuck 90 and the wafer W held on it, back to the initial position forwardly in a direction perpendicularly to the sheet surface in FIG. 1. The driving source 22 is actuated to index the supporting base stand 6 of the supporting means 4, and therefore the cutting blade 48, in the left-right direction in FIG. 1 by the distance Px (or its integral multiplication) of the first group of cutting lines CLx (and as will be described in detail hereinbelow, the indexing is compensated as required on the basis of detection by the thrid detecting means 76). The amount of indexing of the supporting base stand 6 is detected by the first detecting means 52 and fed to the control means 100. The internals Px and Py can be fed in advance to the control means 100 and stored in a memory means 102 (FIG. 2) built in the control means 100. Thereafter, the cutting step described above is again performed, and the wafer W is cut along the next one of the first group of cutting lines CLx.

When the cutting of the wafer W along all of the first group of cutting lines CLx is over, the driving source 98 is actuated to rotate the suction chuck 90 and the wafer W held on it through $90°$. As a result, the second group of cutting lines CLy present on the surface of the wafer W extend in a direction perpendicular to the sheet surface. The driving source 22 is also actuated to move the supporting base stand 6, and therefore the cutting blade 49, by a predetermined amount in the left-right direction in FIG. 1. Consequently, the position, in the left-right direction in FIG. 1, of one of the second group of cutting lines CLy is brought into alignment with the position, in the left-right direction in FIG. 1, of the cutting blade 48. Thereafter, as in the case of the first group of cutting lines CLx, the wafer W is cut along the second group of cutting lines CLy.

In the illustrated precision cutting device, when the thermal expansion (or shrinkage) of the supporting member 10 in the left-right direction in FIG. 1 owing to temperature change is not compensated, there is a possibility that errors exceeding the allowable errors of several micrometers will be produced in the relative positioning of the cutting blade 48 and the cutting lines Clx and CLy of the wafer W. When the driving source 50 is operated continuously or intermittently so as to rotate the cutting blade 48 at relatively high speeds, the driving source 50 generates heat and heat is also built up in the rotating shaft 42. Consequently, the rotating shaft 42 thermally expands in the left-right direction in FIG. 1. Since, however, the right end of the rotating shaft 42 can move over some range in the left-right direction in FIG. 1 with respect to the supporting member 10, the thermal expansion of that portion of the rotating shaft 42 which is to the right of the annular flange 44 merely displaces the right end of the rotating shaft 42 to the right in FIG. 1, and does not affect the position of the cutting blade 48. On the other hand, it will be readily understood that the linear expansion of that portion of the rotating shaft 42 which is left of the annular flange 44 affects the position of the cutting blade 48. The present inventor has experimentally determined, however, that in the precision cutting device of the type illustrated, that portion of the rotating shaft 42 which is to the left of the annular flange 44 is sufficiently short and the amount of its thermal expansion is as small as a fraction of a micrometer, and therefore a change in the position of the cutting blade 48 attributed to such an amount of thermal expansion can be ignored (when the change of the position of the cutting blade 48 by such an amount of thermal expansion is also desired to be compensated, the positioning of the cutting blade 48 can be compensated in accordance with the following theory and method with respect to such an amount of thermal expansion). On the other hand, the heat of the driving source 50 and the heat of the rotating shaft 42 are transmitted to the supporting member 10 directly or indirectly and the supporting member 10 is also heated and thermally expanded. As a result, the position of the cutting blade 48 is changed. The present inventor has experimentally determined that in the precision cutting device of the type shown in the drawings, the amout of thermal expansion of the supporting member 10 is relatively large and a change in the position of the cutting blade 48 attributed to it may possible be as large as several micrometers, and consequently, errors exceeding the allowable errors are likely to occur in the cutting of the wafer W. Thermal expansion of the supprting member 10 beyond the range of the allowable errors can of course occur as a result of changes in the ambient temperature of the presision cutting device. On the other hand, various structural elements other than the rotating shaft 42 and the supporting member 10 thermally expand owing to changes in the ambient temperature of the precision cutting device, for example, but changes in the position of the cutting blade 48 and/or the wafer due to such thermal expansion are very small and can be ignored (when it is desired to compensate changes in the position of the cutting blade 48 and/or the wafer W attributed to such a thermal expansion, the compensaion with respect to such a thermal expansion can also be carried out in accordance with the theory and method described hereinbelow).

Compensation of the thermal expansion (or thermal shrinkage) of the supporting member 10 in the left-right direction in FIG. 1 by temperature change will be described.

Figure 4:
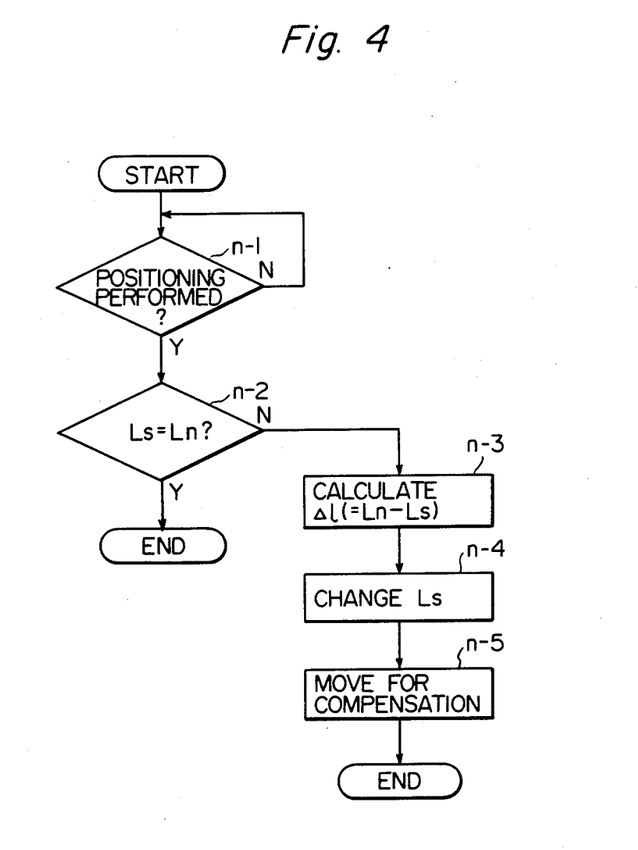
FIG. 4 is a flow chart showing one example of the method of error compensation in the precision cutting device shown in FIG. 1.

The control means 100 compensates the positioning of the cutting blade 48 according to a signal fed from the photoelectric detector 84. More specifically, it compansates the control of the operation if the driving source 22 for moving the supporting base stand 6, and therefore, the cutting blade 48, in the left-right direction in FIG. 1 according to the signal. With reference to FIG. 4 which is a flow chart showing one example of such a compensation method, in step n-1, it is judged or determined whether the positioning movement of the cutting blade 48 (for example, the indexing of the cutting blade 48 in the left-right direction in FIG. 1 by a length coresponding to the interval Px or Py of the cutting lines CLx or CLy on the wafer W shown in FIG. 3) has been performed. When the positioning movement of the cutting blade 48 has been performed, step n-2 sets in and it is determined whether or not the length Ls (the length Ls is stored in the memory means 104 built in the control means 100 illustrated in FIG. 2) of the supporting member 10 (and the bearing member 40 fixed to its free end) at the time of the previous positioning movement of the cutting blade 48 is equal to the length Ln of the supporting member 10 (and the bearing member 40 fixed to its free end) at the present time. When the length Ls is not equal to the length Ln, step n-3 sets in, and the change in length $(Ln-Ls=\Delta l)$ is calculated. Then, step n-4 sets in, the length (Ls) stored in the memory means 104 of the control means 100 is changed to the length (Ln) at the present time. Then, in step n-5, the driving source 22 is actuated to move the supporting base stand 6, and therefore the cutting blade 48, to right or left in FIG. 1 by $c \times \Delta l$ (wherein c is a compensation coefficient which may, for example, be 1).

Thus, in the illustrated precision cutting device, every time the positioning movement of the cutting blade 48 is performed, an error in the positioning of the cutting blade 48 attributed to the thermal expansion of the supporting member 10 (and the bearing member 40 fixed to its free end) is detected, and the cutting blade 48 is moved for compensation according to the detected error. Thus, a cutting error of the wafer W due to the thermal expansion of the supporting member 10 (and the bearing member 40 fixed to its free end portion) can be accurately avoided.

In the illustrated precision cutting device, one end of the measuring standard member 80 is fixed to the bearing member 40 fixed to the free end, i.e. the left end, of the supporting member 10 to cantilever the measuring standard member 80, and the photoelectric detector 84 is mounted on the base end portion, i.e. the right end portion, of the supporting member 10. Conversely, it is possible to fix one end of the measuring standard member 80 to the base end portion of the supporting member 10 thereby cantilevering the measuring standard member 80, and to mount the photoelectric detector 84 on the free end of the supporting member 10 or on the bearing member 40 fixed to the free end. In mounting the photoelectric detector 84 on the free end of the supporting member 10 or the bearing member 40 fixed to it, the measuring standard member 80 may be supported so as to extend along the supporting member 10 by means of a separate suitable supporting frame. Furthermore, in the illustrated precision cutting device, the lines to be detected which are formed on the measuring standard member 80 are detected by the photoelectric detector 84. Alternatvely, it is possible to provide a known non-contacting displacement detector opposite to the free end of the measuring standard member 80, detect the displacement of the free end of the measuring standard member 80 in the left-right direction in FIG. 1 by this detector, and thus detect the amount of thermal expansion of the supporting member 10 (and the bearing member 40 fixed to its free end).

Furthermore, in the illustrated precision cutting device, the relative positioning of the cutting blade 48 and the wafer W in the right-left direction in FIG. 1 is carried out by moving the cutting blade 48. When instead the suction chuck 90 holding the wafer W on it is moved left-to-right in FIG. 1 to preform the relative positioning of the cutting blade 48 and the wafer W, the movement of the suction chuck 90 in the left-right direction in FIG. 1 may be effected according to the thermal expansion of the supporting member 10 (and the bearing member 40 fixed to its free end).

The following Example and Comparative Example show the effect of reducing indexing errors by making the scale 58 in the first detecting means 52 from a material having a coefficient of linear expansion, in a temperature range of $-20°$ to $100°$ C., of not more than $10 \times 10^{-7}/°$ C.

EXAMPLE

A silicon wafer was cut in the following manner by using the precision cutting device shown in FIG. 1 without performing compensation based on detection by the third detecting means 76.

(1) By actuating the driving source 50, the idling operation of the device involving the rotation of the rotating shaft 42 and the cutting blade 48 was carried out continuously for 3 hours.

(2) Silicon wafers W having a diameter of 5 inches and a thickness of 500 micrometers were cut by the method described hereinabove. The wafers W each had a first group of 24 cutting lines CLx disposed at intervals Px of 5 mm and each having a width of 40 micrometers, and a second group of 24 cutting lines CLy disposed at intervals Py of 5 mm and each having a width of 40 micrometers. The cutting blade 48 used was made of diamond abrasives and had a thickness of 18 micrometers. The cutting depth was set at 250 micrometers.

(3) After 60 wafers were cut from the start of cutting (3 hours 10 minutes after the starting of cutting of the first wafer W), a first sampling wafer SW1 was cut along a first group of cutting lines CLx (first sampling cutting). In performing the sampling cutting, a dummy wafer was actually cut once by the cutting blade 48, and the cut position of the dummy wafer was observed by an optical detecting means to determine the actual position of the cutting blade 48 in the left-right direction in FIG. 1. On the basis of this determination, the initial positioning of the first sampling wafer SW1 was carried out. Specifically, the position, in the left-right direction in FIG. 1, of one outermost line among the first group of cutting lines CLx was brought into fully precise alignment with the position of the cutting blade 48 in the left-right direction. In the cutting of the first sampling wafer SW1, the indexing of the cutting blade 48 was performed by 5 mm 23 times. The linear scale 58 in the first detecting means 52 was made of crystallized glass sold under the tradename "Neoceram GC-7.N-0" by Japan Electrical Glass Co., Ltd. which had a coefficient of linear expansion at $-20°$ to $100°$ C. of $0.6 \times 10^{-7}/°$ C.

Figure 5:
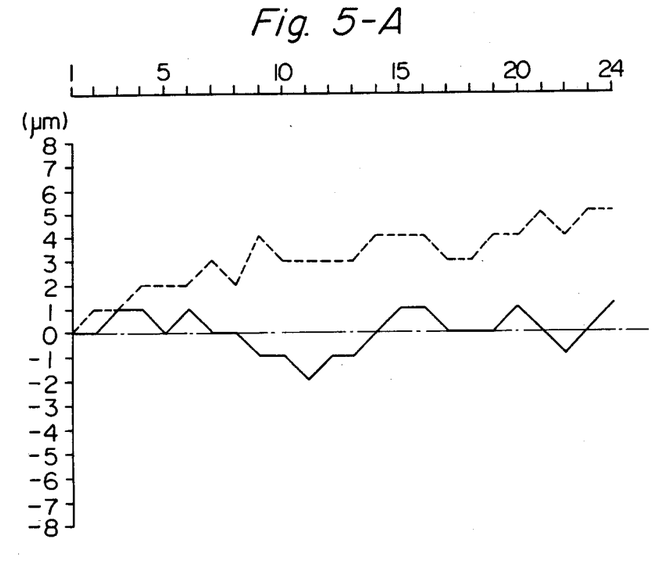

The actual cutting positions in the first to the 24th cuttings and the deviations of the cutting lines CLx from the center line in the cutting of the first sampling wafer SW1 were measured under a microscope (magnification $300 \times$). The results are shown by the solid line in the diagram of FIG. 5-A. In FIG. 5-A, the ordinate represents the amount (micrometers) of deviation, and the abscissa, the first to 24th cuttings successively at equal intervals.

(4) After 176 wafers W (excluding the first sampling wafer and the dummy wafer) were cut as in (2) from the start of cutting (8 hours and 45 minutes after the start of the cutting of the first wafer W), a second sampling wafer SW2 was subjected to a second sampling cutting in the same way as in (3) above.

The actual cutting positions in the 1st to the 24th cutting and the deviations of the cutting lines CLx from the center line in the cutting of the second sampling wafer SW2 were measured in the same way as in (3) above. The results are shown in FIG. 5-B.

COMPARATIVE EXAMPLE

For comparison, a linear scale made of soda-zinc glass having a coefficient of linear expansion at $-20$ to $100°$ C. of about $8 \times 10^{-6}/°$ C. was used as the linear scale 58 in the first detecting means 52. Otherwise, the same first sampling cutting and second sampling cutting as in Example above were performed. The actual cutting positions and the deviations of the cutting lines CLx from the center line in the first sampling wafer SW1 and the second sampling wafer SW2 were measured, and the results are shown by broken lines in FIGS. 5-A and 5-B.

A comparative study of the solid lines showing the results of Example with the broken lines showing Comparative Example in FIGS. 5-A and 5-B clearly shows that the use of the linear scale 58 formed of a material having a coefficient of linear expansion at $-20°$ to $100°$ C. of not more than $10 \times 10^{-7}/°$ C. can markedly reduce errors in indexing without the need to incorporate an expensive temperature control system.

What is claimed is:

1. A precision device for performing an operation on an object, the precision device comprising
    a holding means adapted to hold the object,
    a supporting means for supporting an operating element,
    a driving means for moving at least one of the supporting means and the holding means in a predetermined direction,
    a detecting means including a measuring standard member formed of a material having a low coefficient of linear expansion and a detector for detecting a thermal expansion of at least a part of the supporting means in said predetermined direction relative to the measuring standard member and providing a signal representative of the extent of the thermal expansion, and
    a control means for controlling the operation of the driving means, the control means being adapted to control the driving means to intermittently perform a plurality of positioning movements of at least one of the supporting means and the holding means and to adjust the positioning movements in response to the signal from the driving means to compensate for a thermal expansion of the supporting means since a last positioning movement before the precision device performs a next operation on the object.

2. The precision device of claim 1, wherein the measuring standard member is formed of a material having an absolute value of a coefficient of linear expansion, in a temperature range of $-20°$ to $100°$ C., of not more than $10 \times 10^{-7}/°$ C.

3. The precision device of claim 2 wherein the mesuring standard member is formed of a special glass.

4. The precision device of claim 1 wherein the supporting means comprises a supporting base stand, and a supporting member extending in said predetermined direction from its base end portion fixed to the supporting base stand; the operating element is mounted on the free end portion of the supporting member; and the detecting means detects the amount of thermal expansion of at least a greater portion of the supporting member in said predetermined direction.

5. The precision device of claim 4 wherein the supporting means includes a rotating shaft rotatably mounted on the free end portion of the supporting member in such a manner as to be incapable of moving in said predetermined direction, and the operating element is fixed to the rotating shaft.

6. The precision device of claim 4 wherein the measuring standard member extends along the supporting member from its one end portion fixed to the free end portion of the supporting member.

7. The precision device of claim 4 wherein the measuring standard member extends along the supporting member from its one end portion fixed to the supporting base stand or the base end portion of the supporting member.

8. The precision device of claim 1 wherein the measuring standard member is composed of a scale having many lines to be detected.

9. The precision device of claim 1 which further comprises a second detecting means for detecting the extent of movement of at least one of the supporting means and the holding means in said predetermined direction, the second detecting means comprising a scale having many lines to be detected and a detector for detecting the lines of the scale, the scale being formed of a material having a coefficient of linear expansion, in a temperature range of $-20°$ to $100°$ C., of not more than $10 \times 10^{-7}/°$ C. as an absolute value, and in which the control means controls the operation of the driving means on the basis of the amount of movement of the one of the supporting means and the holding means which is detected by the detector of the second detecting means.

10. The precision device of claim 9 wherein the scasle of the second detecting means is formed of a special glass.

11. The precision device of claim 1 wherein the control means includes a memory means for storing a value representing a last detected thermal expansion of the at least one part of the supporting member, and wherein for each positioning movement the control means comprises the value stored in the memory means after the last positioning movement with another thermal expansion detected by the detector for a next positioning movement and changes the thermal expansion value stored in the memory means when the stored value does not represent the thermal expansion detected for the next positioning movement.

* * * * *